United States Patent Office 3,361,527
Patented Jan. 2, 1968

3,361,527
PROCESS FOR SEPARATING IRON FROM PHOSPHORIC ACID CONTAINING THE SAME
John A. Hinkebein, Manchester, and Ernest L. Koerner, Jr., Bridgeton, Mo., assignors to Monsanto Company, St. Louis, Mo., a corporation of Delaware
No Drawing. Filed Feb. 13, 1964, Ser. No. 344,532
19 Claims. (Cl. 23—165)

---

ABSTRACT OF THE DISCLOSURE

A process is described for stripping phosphate values from a water insoluble organic amine extractant containing phosphoric acid and iron by carrying out the stripping with an aqueous strip solvent and in the presence of an iron complexing agent whereby the phosphate values are extracted into the aqueous solvent and the iron is complexed with the complexing agent and retained in the extractant.

---

This invention pertains to a process for separating iron from phosphoric acid containing the same and, more particularly, to the separation of iron and phosphate values contained in an organic extractant.

It is well-known that phosphoric acid produced by the widely used commercial wet method contains impurities such as silicon, calcium, arsenic, iron, fluoride, aluminum, chromium, vanadium, lead and the like which often require separation to some degree from the wet phosphoric acid prior to its intended use. For example, such phosphoric acid requires some degree of purification with respect to iron when the acid or its salts and derivatives thereof are intended for use in food chemicals, pure chemicals, detergent compositions and the like. Certain organic amines are useful as extractants for purifying phosphoric acid by extracting the phosphoric acid from such metallic and/or cationic contaminants as aluminum, chromium, vanadium, lead and the like. However, in some cases iron appears to be extracted to an objectionable degree with the phosphoric acid into the organic amine extractant phase. This results in the phosphate values obtained from stripping the organic amine extractant containing iron as an impurity. As can be appreciated, therefore, a method for separating iron and phosphoric acid when both are present in the organic amine extractant would represent an advancement in this art.

It is, therefore, an object of this invention to provide an improved process for separating iron from phosphoric acid containing the same.

It is another object of this invention to provide an improved process for the separation of iron and phosphoric acid contained in an organic amine extractant.

It is still another object of this invention to provide in a preferred embodiment a process for purifying phosphoric acid with respect to iron impurities which would enable its use, as well as the salts and derivatives thereof, in food chemicals, pure chemicals, detergent compositions and the like.

These and other objects will become apparent from the detailed description hereinafter.

This invention, in general, pertains to the separation of iron and phosphoric acid contained in an organic amine extractant by complexing the iron in the amine extractant in such a manner and to such a degree that phosphate values can be recovered therefrom containing less iron impurity than would be the case if the iron were not complexed as will be more fully discussed hereinafter. It is possible, if desired, by using optimum process conditions, to achieve phosphate values containing iron impurities as low as 50 p.p.m. and in some cases as low as 1 to 2 p.p.m. or even lower.

Although the following description is primarily concerned with separating iron from wet phosphoric acid it should be noted that the instant invention is capable of separating iron from, in general, any phosphoric acid containing iron, however, it is especially adaptable for wet phosphoric acid. As used herein "wet" phosphoric acid means phosphoric acid produced by the wet method which essentially entails the acidulation of phosphate rock by the use of acids, such as, sulfuric acid. The phosphate rock raw material can, of course, vary depending on, inter alia, the source from which it is mined and is usually obtained from such deposits as those located in Florida and the western states, such as Idaho. Although the extractant methods of the present invention do not appear to be dependent on the concentration of the wet phosphoric acid, it is preferred, however, that the acid be concentrated, i.e., containing less than about 80% water by weight, with an acid containing from 0 to about 50% water by weight being especially preferred.

In general, to prepare the amine extractant containing phosphoric acid and iron, the wet phosphoric acid containing iron and other impurities is contacted with the amine extractant and the phosphoric acid and iron are extracted therefrom leaving behind impurities in a barren aqueous phase or if insufficient water is present the impurities will precipitate. The aqueous phase and/or precipitates is then separated from the amine extractant phase. In many instances, the amine extractant can be used in the undiluted liquid form, however, it is usually more advantageous to dissolve the amine in an organic diluent. In general, any proportion of the amine to organic diluent can be used, however, relatively high proportions on a volume basis of the amine to organic diluent results in a relatively viscous extractant which is difficult to use for extraction while relatively low proportions on a volume basis results in the necessity for using unduly large volumes of the extractant. In most instances, amounts of the amines which are particularly well suited for use in the organic diluent are between about 1% and 80% by volume. In general, the amount of the extractant necessary to be contacted with the wet phosphoric acid is dependent, inter alia, on the temperature and concentration of the wet phosphoric acid, as well as the equilibrium distribution between the phosphoric acid in the aqueous phase and the phosphoric acid in the extractant phase. Because the amines vary in degree of extraction as well as being influenced by the particular organic diluent used it should be noted that preferably only amounts of the extractant which are sufficient to remove the phosphoric acid should be used. The preferred amounts can be readily determined by conducting equilibrium distribution tests on the particular wet phosphoric acid as well as the particular extractant to be used in order to determine the degree of extraction which is desired.

In general, any organic amine compound which is water-insoluble and/or capable of forming desired water-insoluble salts can be used in the present invention and especially organic mono-amine compounds. In particular, organic amine compounds containing a terminal polar nitrogen-containing group and at least 2 hydrophobic substituent groups, such as those compounds derived from fatty acids of varying molecular weights and different degrees of saturation, are suitable for use. A suitable amine may be secondary or tertiary amines as well as quaternary ammonium compounds. Those secondary and tertiary aliphatic amines having 2 substituent groups, each containing from about 7 to about 15 carbon atoms, and including branched chain structures as well as straight chain structures, are quite suitable for use in the present invention. Mixtures of amines are suitable when containing to a predominant extent the foregoing structures. Tertiary aliphatic amines in which the third substituent group contains less than about 18 carbon atoms are also quite suitable for use in the present invention. Other amines can be used although, in general, they are less suitable. For example, primary aliphatic amines exhibit an undesirable tendency to precipitate as the amine salts when in contact with wet phosphoric acid. The secondary or tertiary aliphatic amines containing less than about 7 carbon atoms on each of at least 2 substituent groups exhibit the undesirable tendency to be water-soluble. The secondary or tertiary aliphatic amines containing more than about 15 carbon atoms on each of at least 2 substituent groups exhibit the undesirable tendency to form salts which are relatively insoluble in the extractant phase. In addition, aromatic amines, whether primary, secondary or tertiary are less suitable because they exhibit such undesirable tendencies as relatively poor salt solubilities and relatively poor extracting capabilities.

It should also be noted that quaternary ammonium bases are suitable for use as an extractant in the present invention. In general, all of the foregoing relating to the tertiary amines is applicable to quaternary ammonium bases. The fourth substituent aliphatic group attached to the nitrogen may contain any number of carbon atoms but preferably should not contain over about 15 carbon atoms.

The term "water-insoluble" as used herein with respect to the amines including the quaternary ammonium compounds, does not necessarily require complete insolubility. It merely requires that the material be sufficiently immiscible with the wet phosphoric acid phase to allow physical separation of the liquids into two distinct phases.

The preferred amines useful as extractants are long chain hydrocarbyl amines of the following formula (1) 

wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen and saturated and ethylenically unsaturated aliphatic hydrocarbyl groups containing from 1 to about 18 carbon atoms.

The preferred quaternary ammonium compounds useful as extractants are long chain hydrocarbyl quaternary ammonium compounds of the following formula (2) 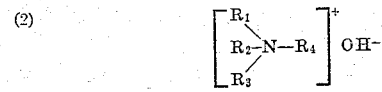

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups containing from 1 to about 18 carbon atoms, and $R_4$ is a member selected from the class consisting of saturated and ethylenically unsaturated aliphatic hydrocarbyl groups containing from 1 to about 15 carbon atoms.

In addition, it should be noted that the salts of the foregoing amines and ammonium compounds can be used in the instant invention as the amine extractant. In general, the amine and ammonium salts can be formed from many organic and inorganic acids and preferably those acids which are stronger than phosphoric acid, i.e. having a Ka greater than about $8 \times 10^{-3}$, especially the inorganic acids such as sulfuric acid, hydrochloric acid, nitric acid and the like. Ionization constant of an acid (Ka) as used herein refers to the dissociation of an acidic electrolyte at room temperature, i.e., about 25° C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

The following are representative of suitable amine extractants for use in the present invention.

Di-n-decylamine $[CH_3(CH_2)_9]_2NH$
Tri-n-octylamine $[CH_3(CH_2)_7]_3N$
Methyltrioctylammonium hydroxide
 $[[CH_3(CH_2)_7]_3(CH_3)N]^+OH^-$
Methyldioctylamine $[CH_3(CH_2)_7]_2(CH_3)N$
Dimethyldioctyl ammonium hydroxide
 $[[CH_3(CH_2)_7](CH_3)_2N]^+OH^-$
Di-n-dodecylamine $[CH_3(CH_2)_{11}]_2NH$
Tri-n-dodecylamine $[CH_3(CH_2)_{11}]_3N$
Dimethyldidodecyl ammonium hydroxide
 $[[CH_3(CH_2)_{11}]_2(CH_3)_2N]^+OH^-$
Tricaprylyl amine $R_3N$, where R is a mixture of $C_8H_{17}$ and $C_{10}H_{21}$ but predominantly $C_8H_{17}$
Tri-iso-octyl amine $[CH_3(CH_2)_7]_3N$, where $C_8H_{17}$ groups are comprised of mixed isomers
N,N-didodecenyl-N-n-butyl amine $(C_4H_9)(C_{12}H_{23})_2N$
N-dodecenyl-N-trialkylmethyl amine
 $(C_{12}H_{23})(R_1R_2R_3C)NH$, where $R_1+R_2+R_3$ equal $C_{11}H_{23}$ or $C_{14}H_{29}$
N-lauryl-N-trialkylmethyl amine
 $(C_{12}H_{26})(R_1R_2R_3C)NH$, where $R_1+R_2+R_3$ equal $C_{11}H_{23}$ or $C_{14}H_{29}$
Tricoco amine $R_3N$, where R is a mixture of:

|  | Percent |
|---|---|
| $C_8H_{17}$ to $C_{10}H_{21}$ | 15 |
| $C_{12}H_{25}$ | 48 |
| $C_{14}H_{29}$ | 18 |
| $C_{16}H_{33}$ | 9 |
| $C_{18}H_{37}$ (stearyl-oleyl) | 10 |

Trilauryl amine $R_3N$, where R is a mixture of:

|  | Percent |
|---|---|
| $C_{12}H_{26}$ | 88 |
| $C_{14}H_{29}$ isomers | 10 |
| $C_{10}H_{21}$ | 2 |

Di-n-decyl ammonium sulfate
 $2[[CH_3(CH_2)_9]_2NH] \cdot H_2SO_4$
Tri-n-octylammonium chloride
 $[CH_3(CH_3)_7]_3N \cdot HCl$
Dimethyldioctyl ammonium chloride
 $[[CH_3(CH_2)_7](CH_3)_2N]^+Cl^-$
Bis-methyltridodecylammonium sulfate
 $2[[CH_3(CH_2)_{11}]_3NCH_3]SO_4^=$
Dimethyldidodecyl ammonium chloride
 $[[CH_3(CH_2)_{11}]_2(CH_3)_2N]^+Cl^-$
Tricaprylyl amine sulfate $2(R_3N) \cdot H_2SO_4$, where R is a mixture of $C_8H_{17}$ and $C_{10}H_{21}$ but predominantly $C_8H_{17}$
Tricaprylyl amine bisulfate $R_3N \cdot HSO_4$, where R is a mixture of $C_8H_{17}$ and $C_{10}H_{21}$ but predominantly $C_8H_{17}$ Although the amines are capable of extracting when in the undiluted liquid form it is preferred that they be utilized in conjunction with an organic diluent for greater ease in handling and extracting control. In general, organic diluents which are suitable for use in the present invention are organic solvents in which the amines are quite soluble and, in addition, are substantially water insoluble. A wide range of organic solvents are effective including kerosene, mineral spirits, naphtha, benzene, xylene, toluene, nitrobenzene, carbon tetrachloride, chloroform, trichloroethylene and the like.

In some instances it is highly desirable to add minor amounts of suitable additives to increase the solubility of the amine compounds in certain organic solvents. Additives which have been especially effective as solubilizing agents are, in general, water-insoluble alcohols which are soluble in the organic diluent and preferably are monohydric higher aliphatic alcohols containing about 6 to about 20 carbon atoms; especially preferred are the primary alcohols containing not more than 15 carbon atoms. For example, tricaprylyl amine bisulfate, about 10% by total volume, is rendered more soluble in kerosene by the addition of about 5% by total volume of n-decyl alcohol as an additive. Suitable alcohols include 1-hexanol, 4-methyl-2-pentanol, 2-ethyl-1-butanol, 2-heptanol, 1-octanol, 2-octanol, 5-ethyl-2-nonanol, 1-dodecanol, 1-tetradecanol, and the like.

The extraction process, as well as the stripping or removal process, can be carried out in a batch operation in which case it may be necessary to repeat the extraction or stripping until the desired advantageous degree of extraction or stripping is reached. However, the process may be carried out in a continuous operation, with counter-current contact of the different phases, or in any other continuous manner.

After the organic amine extractant containing the iron and phosphoric acid has been prepared, the phosphoric acid can be removed as phosphate values, i.e., either as phosphoric acid and/or phosphate salts, as well as separated from the iron by stripping the phosphate values from the amine extractant with an aqueous solvent in the presence of a complexing agent. The iron is complexed in the amine extractant and retained therein during the stripping by the complexing agent. Such complexing agents which are suitable are, in general, those which form an iron complex, believed to be an anionic iron complex, which has greater affinity for the amine extractant phase than for the stripping solvent phase. In particular are the anionic complexing agents of the unidentate ligand class such as the halogen anions (fluoride, chloride and bromide) and the cyanide anion and the multidentate ligand class such as the bidentate and tridentate complexing ligands as well as the chelate ligand class, that is, a ligand capable of complexing the iron through two or more coordinating atoms. Such multidentate anionic complexing agents include the polyphosphate anions, that is, anions of phosphate polymers, such as, pyrophosphate, tripolyphosphate, tetrapolyphosphate, hexametaphosphate (usually a mixture of phosphate polymers averaging from about 6 to about 60 phosphorus atoms in chain length) and the like; anions of the alkylene polyamine carboxylic acid type, such as ethylene diamine tetraacetic acid, hexamethylene diamine tetraacetic acid, and the like; anions of the amine polycarboxylic acid type such as nitrilo triacetic acid, nitrilo diacetic acid and the like; anions of the alkylenediphosphonic acids and the hydroxy substituted alkylenediphosphonic acids such as methylene diphosphonic acid, ethylene diphosphonic acid, 1-hydroxyethylidene diphosphonic acid, and the like; anions of the amine polyalkylene phosphonic acids such as amino tri(methylphosphonic acid), amino di(methylphosphonic acid) and the like; and anions of the hydroxy carboxylic acids such as lactic, citric, tartaric, gluconic, arabonic, galactonic, 2-ketogluconic, saccharic, mucic, gluco-heptonic acids and the like. Because of the relative inexpensiveness as well as ready availability of the polyphosphate anions, they are preferred with the anions of pyrophosphate and tripolyphosphate being particularly preferred, especially the anion of tripolyphosphate. Amounts of the complexing agents which are suitable depend upon, inter alia, degree of iron contamination of the phosphoric acid, degree of iron removal desired and ability of complexing agent to complex the iron in the amine extractant phase, and can be readily determined by conducting equilibrium distribution tests on the particular complexing agent, amine extractant and stripping solvent to be used.

In addition, the complexing agent can be added to the amine extractant after the iron and phosphoric acid have been extracted into the amine phase and/or to the stripping solvent prior to the stripping operation. It is usually desirable, for process simplification, to add the complexing agent to the stripping solvent prior to the stripping operation but in any event the iron should be complexed in the amine extractant while the phosphate values are being stripped from the extractant.

In general, the stripping solvents suitable for use are those which are capable of stripping phosphate values from the amine extractant. In most cases, aqueous stripping solvents are preferred, such as water and basic, acidic or neutral aqueous solutions. In some cases the stripping mechanism appears to be a solubility mechanism such as the use of water as a stripping agent in which the phosphate value is more soluble than in the amine extractant; while in other cases the stripping mechanism appears to be an anion exchange mechanism such as the use of an acidic aqueous solution of hydrochloric acid in which the stripping mechanism is believed to be represented by the following:

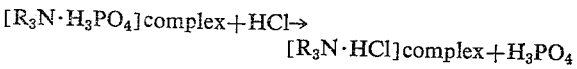

In addition, the choice of the stripping solvent is governed to a large extent by the type of phosphate values desired to be recovered in the strip liquor and, in general, for use in stripping phosphate salts in aqueous solution containing any metal source can be used. In particular, for use in stripping phosphate salts as the phosphate values are those alkali metal, ammonium and alkaline earth metal sources which are capable of yielding the desired alkali metal, ammonium or alkaline earth metal cation in the aqueous solvent. Such alkali metal sources include the salts, oxides and hydroxides, such as $Na_2CO_3$, $NaHCO_3$, $NaCl$, $NaH_2PO_4$, $Na_2HPO_4$, $Na_3PO_4$, $NaOH$, $Na_2O$, $Na_2SO_4$, $NaNO_3$, $K_2CO_3$, $KCl$, $KNO_3$, $KOH$, $K_2O$, $Li_2CO_3$, $LiCl$, $LiNO_3$, $Li_2SO_4$ and the like, including mixtures thereof. Although alkali metal sources of cesium and rubidium can, in some cases, be used in practicing this invention, since they are relatively expensive and are not readily available they are not believed to offer the advantages for use as the foregoing alkali metal sources. In addition, such ammonium sources include $NH_3$, $(NH_4)_2CO_3$, $(NH_4)HCO_3$, $(NH_4)H_2PO_4$, $(NH_4)_2HPO_4$, $(NH_4)_2SO_4$, $NH_4Cl$ and the like, including mixtures of these. Further, the alkaline earth metal sources include salts, oxides and hydroxides, such as $CaCO_3$, $CaCl_2$, $Ca(OH)_2$, $CaO$, $Ca(NO_3)_2$, $CaH_2PO_4$, $MgO$, $MgCO_3$, $MgCl_2$, $Mg(NO_3)_2$ and the like, including mixtures of these. Although the alkaline earth metal sources of strontium and barium can, in some cases, be used in practicing this invention, since they are relatively expensive and are not readily available they are not believed to offer the advantages for use as the foregoing alkaline earth metal sources. Further, aqueous stripping solvents containing other metal salts can be used which include aluminum hydroxide and aluminum salts, such as, aluminum sulfate, aluminum chloride, aluminum nitrate and the like as well as other heavy metal salts. In addition, mixtures of all of the foregoing metal sources can be used, for example, a mixture of calcium and aluminum salts, sodium and aluminum salts and the like. For use in stripping phosphoric acid as the phosphate value are aqueous solvents consisting essentially of water or an acidic aqueous solution of an acid which is stronger than phosphoric, i.e., having a Ka greater than about $8 \times 10^{-3}$, and which includes such inorganic acids as hydrochloric acid, sulfuric acid, nitric acid and the like. The amounts of the aqueous stripping solvent which are suitable depend upon, inter alia, degree of phosphate value removal desired, particular amine and complexing agent used, and the like and can readily be determined by conducting equilibrium distribution tests on the particular stripping solvent, amine and complexing agent to be used.

A typical embodiment of the process of the present invention for separating iron and phosphate values from the organic amine extractant is by the use of a polyphosphate, such as tetrasodium pyrophosphate, tetrapotassium pyrophosphate, sodium tripolyphosphate, potassium tripolyphosphate and the like as the complexing agent and an aqueous sodium hydroxide and/or sodium carbonate solution as the stripping solvent. Preferably the amine extractant phase containing the phosphoric acid and iron is from about 20 to 50% by weight in the organic diluent. In general, the complexing agent should preferably be used in amounts based on the degree of iron in the extractant in a weight ratio of complexing agent to iron of at least about 4:1 and preferably about 8:1 to about 18:1. Weight ratios above 18:1 and as high as 50:1 and higher can be used but are not usually desirable since such amounts do not appear to increase the complexing efficiency of the complexing agent. The aqueous sodium hydroxide and/or sodium carbonate solution should preferably be from about 5 to about 50% by weight concentration and contain enough sodium to remove from about 50% to as high as 95% by weight of phosphoric acid from the amine extractant based on the removal of the phosphate values as monosodium orthophosphate. In this connection it is preferred for optimum process results to keep the aqueous strip liquor phase in equilibrium with the amine extractant phase below about a pH of 3 in order to aid the complexed iron to remain in the amine extractant phase. Although temperatures can be varied, it is preferred that temperatures from about 25° C. to about 100° C. be maintained during the process. Temperatures, such as about 30 to 65° C., appear to aid in handling and controlling the amine extractant phase and are, therefore, especially preferred.

The sodium phosphate strip liquor can then be further processed as is well known in the art to such useful phosphate salts as mono-, di- and tri-sodium phosphates, sodium pyrophosphates, sodium tripolyphosphates, sodium trimetaphosphates and the like, as well as to phosphoric acid by various methods such as processing through cation exchange resins.

The foregoing process also enables the use of a simple and advantageous method for stripping the amine extractant containing the complexed iron in order to regenerate the amine extractant as well as to recover the iron and polyphosphate anion complexing agent. In this respect, the polyphosphate anion complexing agent can be recycled, if desired, for further use as a complexing agent in the stripping solvent. In general, the stripped amine extractant, that is, the amine extractant containing the complexed iron can be further stripped with an aqueous basic solution of the same type as previously described as being suitable for use as the stripping solvent. This stripping operation regenerates the amine extractant, which, if desired, can be recycled to the extraction operation. For example, an alkali metal hydroxide or carbonate, preferably sodium hydroxide or sodium carbonate, in an aqueous soltuion of from about 5 to about 50% concentration can be used as the stripping solvent. The pH of the aqueous strip liquor phase in equilibrium with the amine extractant phase is preferably controlled between about 4 to 9.5 for best results in regenerating the amine extractant and keeping the complexed iron in the aqueous solution.

The aqueous strip liquor from the amine regeneration step contains iron and the polyphosphate anion complexing agent. The iron can be removed from this strip liquor by precipitation as the iron hydroxide by raising the pH of the aqueous strip liquor to about 11 to 12 by use of a strong base such as an alkali metal carbonate, phosphate, or hydroxide, and preferably sodium hydroxide, sodium carbonate or trisodium phosphate. After removal of the iron precipitate by such means as filtration, the filtrate containing the polyphosphate complexing agent can, if desired, be recycled for use in the aqueous stripping solvent.

The following examples are presented for illustrative purposes with parts by weight being given unless otherwise indicated.

In the examples a stripping stage and one or two scrub stages, as indicated, are used in series. In the stripping stage the entering materials are the amine extractant containing phosphoric acid and iron, the aqueous strip solvent and the scrub solvent from the scrub stage while the exiting materials are the stripped amine extractant and the aqueous strip liquor. In the scrub stage the entering materials are the scrub solvent and the strip liquor from the strip stage while the exiting materials are the scrubbed strip liquor and scrub solvent which is passed to the strip stage. In two scrub stages the second stage is used in series with the first scrub stage in order to further scrub the strip liquor with the scrub solvent.

Example 1

Several amine extractants of about 50 ml. each and comprised of about 25% by volume of tricaprylylamine in a light aromatic petroleum fraction and containing about 83.3 grams of phosphoric acid per liter and 2.4 grams iron per liter were stripped in a one stage simulated continuous process by a stripping solvent comprised of a 20% by weight aqueous solution of sodium tripolyphosphate and sodium hydroxide. The amount of sodium in the strip solvent was varied as indicated based on the amount theoretically needed to form monosodium phosphate and the amount of sodium tripolyphosphate which was used was based on a weight ratio of STP/Fe of about 14. The strip liquor was thereafter scrubbed in a second stage simulated continuous process by an amine extractant of about 10 ml. comprised of about 25% by volume of tricaprylylamine in a light aromatic petroleum fraction. The simulated continuous extractions were carried out at about 45° C. The following table presents the results of the analyses of scrubbed strip liquor and the stripped amine extractant after enough cycles had been run to establish what is believed to be the equilibrium distribution for the system.

TABLE I

| Cycle No. | Na, Percent by Weight | Strip Liquor | | | | Stripped Extractant | |
|---|---|---|---|---|---|---|---|
| | | Phosphate Value,[1] g./l. | Phosphate Value,[2] g./l. | Percent Phosphate Value,[1] stripped | Fe,[3] p.p.m. | Phosphate Value,[1] g./l. | Phosphate Value,[2] g./l. |
| 6 | 70 | 157.8 | 3.4 | 79.6 | | 14.5 | 18.9 |
| 7 | 70 | 156.8 | 3.4 | 79.1 | 10.2 | 14.9 | 18.9 |
| 8 | 70 | 158.8 | 3.2 | 80.1 | 9.2 | 14.2 | 19.0 |
| 5 | 80 | 157.8 | 5.8 | 87.9 | 15.2 | 8.7 | 18.0 |
| 6 | 80 | 156.0 | 6.8 | 87.2 | 13.6 | 9.2 | 17.5 |
| 5 | 85 | 156.3 | 6.9 | 90.8 | 21.3 | 6.6 | 17.5 |
| 6 | 85 | 157.3 | 6.8 | 91.4 | 22.9 | 6.2 | 17.5 |
| 5 | 90 | 156.8 | 8.6 | 94.9 | 49.3 | 3.7 | 16.6 |
| 6 | 90 | 156.8 | | 94.9 | 51.9 | 3.7 | |

[1] Phosphate value calculated as $H_3PO_4$.  [2] Phosphate value calculated as $H_5P_3O_{10}$.  [3] Fe calculated as Fe in $H_3O_4$ in p.p.m.

As can be observed from the above table, the phosphate values stripped from the amine extractant gave yields from about 79% to as high as 95% expressed as phosphoric acid while the iron in the strip liquor gave yields from about 10 to about 50 p.p.m. from an amine extractant containing 28,000 p.p.m. This dramatically illustrates the ability to achieve the recovery of phosphate values with a substantial reduction in iron content in a process according to the teachings of the present invention.

*Example 2*

A quantity of an amine extractant comprised of about 25% by volume of tricaprylyl amine in a light aromatic petroleum fraction and containing about 93.84 grams of phosphoric acid per liter and about 1.93 grams of iron per liter was stripped continuously in mixer-settlers of one strip stage and two scrub stages. The stripping solvent was comprised of an aqueous solution of sodium tripolyphosphate and sodium hydroxide. The scrub solvent used was comprised of 25% by volume of tricaprylyl amine in a light aromatic fraction. The flow rates were adjusted to give the conditions of 85% of the amount of sodium theoretically needed to give monosodium phosphate and an STP/Fe weight ratio of about 14. The temperature was maintained at about 45 to 50° C. during the run. A material balance made after 39 minutes of continuous processing gave the indicated results in the following table.

TABLE 2

| Stream | Input | | | | | Output | | | | |
|---|---|---|---|---|---|---|---|---|---|---|
| | Volume (mls.) | $H_3PO_4$ (g.) | $H_5P_3O_{10}$ (g.) | Na (g.) | Fe (g.) | Volume (mls.) | $H_3PO_4$ (g.) | $H_5P_3O_{10}$ (g.) | Na (g.) | Fe (g.) |
| (1) Amine extractant phase containing phosphoric acid and iron | 786 | 73.76 | 0 | 0 | 1.517 | --- | --- | --- | --- | --- |
| (2) Scrub solvent (amine) | 156 | 0 | 0 | 0 | 0 | --- | --- | --- | --- | --- |
| (3) Total solvent (1 and 2) | 942 | 73.76 | 0 | 0 | 1.517 | 915 | 11.19 | 12.05 | 0 | 1.515 |
| (4) Strip liquor | 343 | 0 | 14.26 | 14.30 | 0 | 370 | 62.57 | 2.21 | 14.30 | .002 |

As can be observed from the above table, about 85% of the phosphate value was recovered, expressed as phosphoric acid, while the strip liquor contained about 20 p.p.m. iron which again illustrates in an effective manner the teachings according to the present invention when the process is conducted in a continuous stripping system.

What is claimed is:

1. In a process for stripping, with an aqueous strip solvent, phosphate values from a water-insoluble organic amine extractant containing phosphoric acid and iron, the improvement comprising carrying out said stripping in the presence of an iron complexing agent, said iron complexing agent being added to said amine extractant containing phosphoric acid and iron or to said aqueous strip solvent, whereby said phosphate values are extracted into said aqueous solvent and said iron is complexed with said complexing agent and retained in said extractant.

2. In a process for stripping, with an aqueous strip solvent, phosphate values from a water-insoluble organic amine extractant containing phosphoric acid and iron, said amine extractant characterized by containing a terminal polar nitrogen containing group and at least two hydrophobic substituent groups, the improvement comprising carrying out said stripping in the presence of an iron complexing agent, said iron complexing agent being added to said amine extractant containing phosphoric acid and iron or to said aqueous strip solvent, whereby said phosphate values are extracted into said aqueous solvent and said iron and said complexing agent form an iron complex and are retained in said extractant.

3. The process of claim 2, wherein said amine extractant has the following formula

wherein $R_1$ and $R_2$ are members selected from the class consisting of saturated and ethylenically unsaturated aliphatic hydrocarbyl groups containing from about 7 to 15 carbon atoms and $R_3$ is a member selected from the class consisting of hydrogen, saturated and ethylenically unsaturated aliphatic hydrocarbyl groups containing from 1 to about 18 carbon atoms.

4. The process of claim 3, wherein said complexing agent is a polyphosphate anion.

5. The process of claim 4, wherein said polyphosphate anion is tripolyphosphate and said stripping is carried out with the pH of the equilibrium distribution aqueous phase below about 3.

6. The process of claim 5, wherein said aqueous strip solvent is an aqueous solution containing material sources selected from the group consisting of alkali metal, ammonium, alkaline earth metal and mixtures thereof whereby said phosphate values are extracted into said aqueous solvent to form phosphate salts.

7. The process of claim 4, wherein said polyphosphate anion is pyrophosphate and said stripping is carried out with the pH of the equilibrium distribution aqueous phase below about 3.

8. The process of claim 2, wherein said amine extractant has the following formula

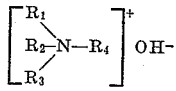

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups containing from 1 to about 18 carbon atoms, and $R_4$ is a member selected from the class consisting of saturated and ethylenically unsaturated aliphatic hydrocarbyl groups containing from 1 to about 15 carbon atoms.

9. The process of claim 8, wherein said complexing agent is a polyphosphate anion.

10. The process of claim 9, wherein said polyphosphate anion is tripolyphosphate and said stripping is carried out with the pH of the equilibrium distribution aqueous phase below about 3.

11. The process of claim 10, wherein said aqueous strip solvent is an aqueous solution containing material sources selected from the group consisting of alkali metal, ammonium, alkaline earth metal and mixtures thereof whereby said phosphate values are extracted into said aqueous solvent to form phosphate salts.

12. The process of claim 9, wherein said polyphosphate anion is pyrophosphate and said stripping is carried out with the pH of the equilibrium distribution aqueous phase below about 3.

13. A process for the separation of iron from phosphoric acid containing the same which comprises contacting said acid with a water-soluble amine extractant containing a terminal polar nitrogen containing group and at least two hydrophobic substituent groups in amounts sufficient to extract said acid and form a water-insoluble extractant phase comprising said amine, phosphoric acid and iron, and stripping said extractant phase with an aqueous strip solvent in the presence of an iron complexing agent, said iron complexing agent being added to said amine extractant containing phosphoric acid and iron or to said aqueous strip solvent, whereby the phosphate values are extracted into said aqueous solvent and said iron and complexing agent form an iron complex and are retained in said extractant.

14. A process for the separation of iron from phosphoric acid containing the same which comprises contacting said acid with a water-insoluble amine extractant having the formula

wherein $R_1$ and $R_2$ are members selected from the class consisting of saturated and ethylenically unsaturated aliphatic hydrocarbyl groups containing from about 7 to 15 carbon atoms and $R_3$ is a member selected from the class consisting of hydrogen, saturated and ethylenically unsaturated aliphatic hydrocarbyl groups containing from 1 to about 18 carbon atoms; said extractant being used in an amount sufficient to extract said acid and form a water-insoluble extractant phase comprising said amine, phosphoric acid and iron, and stripping said extractant phase with an aqueous strip solvent in the presence of an iron complexing agent, said iron complexing agent being added to said amine extractant containing phosphoric acid and iron or to said aqueous strip solvent, whereby the phosphate values are extracted into said aqueous solvent and said iron and complexing agent form an iron complex and are retained in said extractant.

15. The process of claim 14, wherein said complexing agent is the tripolyphosphate anion and said stripping is carried out with the pH of the equilibrium distribution aqueous phase being below about 3.

16. A process for the separation of iron from phosphoric acid containing the same which comprises contacting said acid with a water-insoluble amine extractant having the formula

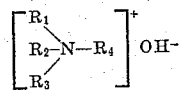

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups from 1 to about 18 carbon atoms, and $R_4$ is a member selected from the class consisting of saturated and ethylenically unsaturated aliphatic hydrocarbyl groups containing from 1 to about 15 carbon atoms; said extractant being used in an amount sufficient to extract said acid and form a water-insoluble extractant phase comprising said amine, phosphoric acid and iron, and stripping said extractant phase with an aqueous strip solvent in the presence of an iron complexing agent, said iron complexing agent being added to said amine extractant containing phosphoric acid and iron or to said aqueous strip solvent, whereby the phosphate values are extracted into said aqueous solvent and said iron and complexing agent form an iron complex and are retained in said extractant.

17. A process for removing phosphate values from a water-insoluble amine extractant containing phosphoric acid and iron, said amine extractant having the following formula

wherein $R_1$ and $R_2$ are members selected from the class consisting of saturated and ethylenically unsaturated aliphatic hydrocarbyl groups containing from about 7 to 15 carbon atoms and $R_3$ is a member selected from the class consisting of hydrogen, saturated ethylenically unsaturated aliphatic hydrocarbyl groups containing from 1 to about 18 carbon atoms; which comprises stripping said extractant with an aqueous solvent in the presence of an iron complexing agent, said iron complexing agent being added to said amine extractant containing phosphoric acid and iron or to said aqueous strip solvent, whereby said phosphate values are extracted into said aqueous solvent and said iron and complexing agent form an iron complex and are retained in said extractant, regenerating said amine extractant by extracting therefrom said iron complex by use of a basic aqueous solution, precipitating iron as iron hydroxide at a pH of about 11 to 12 from said basic aqueous solution, and recycling said basic aqueous solution for reuse in stripping said water-insoluble extractant.

18. The process of claim 17, wherein said complexing agent is the tripolyphosphate anion and said stripping is carried out with the pH of the equilibrium distribution aqueous phase being below about 3.

19. A process for the separation of iron from phosphoric acid containing the same which comprises contacting said acid with a water-insoluble amine extractant dissolved in an organic diluent, said amine extractant having the formula

wherein $R_1$ and $R_2$ are members selected from the class consisting of saturated and ethylenically unsaturated aliphatic hydrocarbyl groups containing from about 7 to 15 carbon atoms and $R_3$ is a member selected from the class consisting of hydrogen, saturated ethylenically unsaturated aliphatic hydrocarbyl groups containing from 1 to about 18 carbon atoms; said extractant being used in an amount sufficient to extract said acid and form a water-insoluble extractant phase comprising said amine, phosphoric acid and iron, stripping said extractant with an aqueous strip solvent in the presence of an iron complexing agent, said iron complexing agent being added to said amine extractant containing phosphoric acid and iron or to said aqueous strip solvent, whereby the phosphate values are extracted into said aqueous solvent and said iron and complexing agent form an iron complex and are retained in said extractant, regenerating said amine extractant by extracting therefrom said complexed iron by use of a basic aqueous solution, precipitating iron as iron hydroxide at a pH of about 11 to 12 from said basic aqueous solution, and recycling said basic aqueous solution for reuse in stripping said water-insoluble extractant.

References Cited

UNITED STATES PATENTS

| | | | |
|---|---|---|---|
| 3,306,702 | 2/1967 | Odland et al. | 23—165 |
| 3,145,081 | 8/1964 | Surls et al. | 23—22 X |
| 3,186,809 | 6/1965 | Kreevoy et al. | 23—312 |
| 3,297,401 | 1/1967 | Sakomura et al. | 23—165 |
| 3,298,782 | 1/1967 | Archambault | 23—165 |

OSCAR R. VERTIZ, Primary Examiner.

A. J. GREIF, Assistant Examiner.